United States Patent Office 2,969,045
Patented Jan. 24, 1961

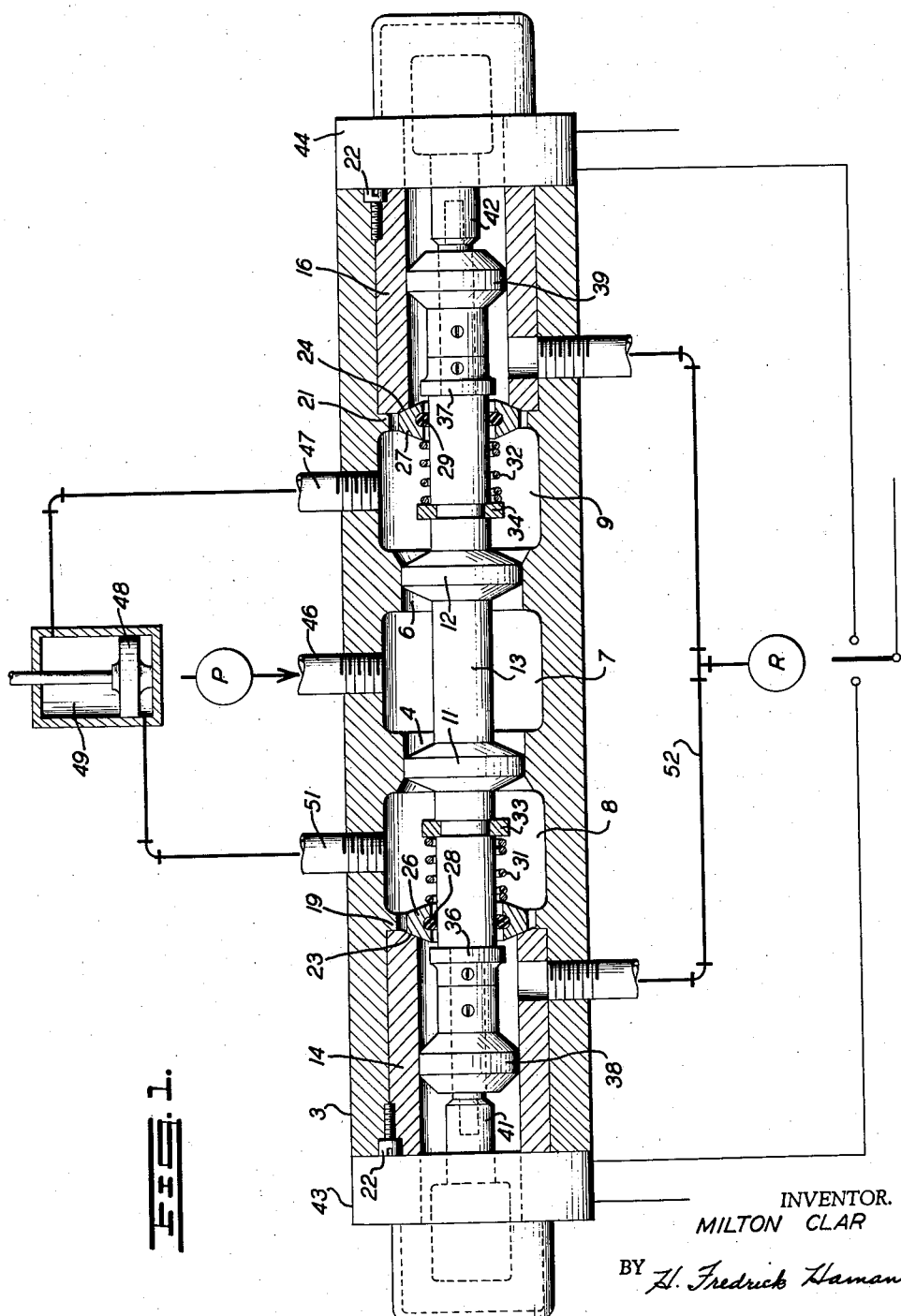

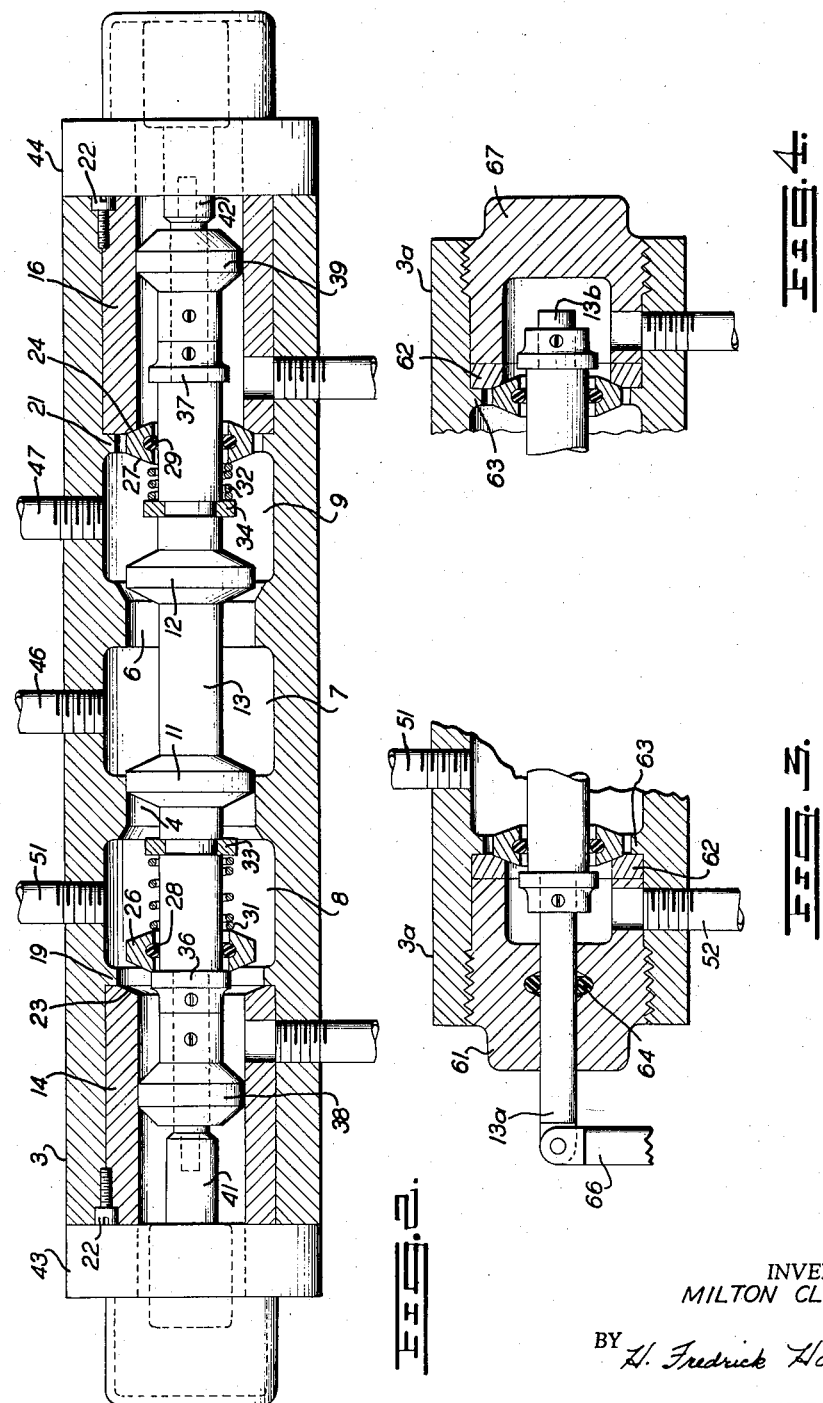

2,969,045
SPOOL-TYPE VALVE FOR USE IN HYDRAULIC SYSTEMS

Milton Clar, Washington, D.C., assignor to ACF Industries, Incorporated, New York, N.Y., a corporation of New Jersey Filed Feb. 26, 1959, Ser. No. 795,848

7 Claims. (Cl. 121—46.5)

This invention relates to valves and, more particularly, to spool-type valves adapted for use in hydraulic systems.

Conventional spool valves employed in high pressure hydraulic systems to provide multiple flow paths are subject to leakage of fluid through the clearance provided between the spools and their respective cylindrical ports. Although the valve members are closely fitted within their respective cylindrical ports, sufficient clearance must be provided to accommodate a film of lubricating liquid to permit easy shifting of the valve members. Therefore, when liquid under pressure is supplied to one of the ports, the pressure causes the lubricant film to flow into a low pressure area at a rate proportional to the pressure and causes inadvertent movement of hydraulically operated parts, such as airplane flaps.

An object of the present invention resides in the provision of a leak-proof spool valve for use in a hydraulic system to prevent inadvertent movement of hydraulically operated parts.

Another object is to provide a spool valve having valve members slidably mounted on the spool stem to prevent leakage of fluid from a high pressure area to a low pressure area.

A further object of the invention resides in the provision of a spool valve which is simple and inexpensive in construction and reliable in operation.

The invention embodies other novel features, details of construction and arrangement of parts which are hereinafter set forth in the specification and claims and illustrated in the accompanying drawings, forming part thereof, wherein:

Fig. 1 is a longitudinal section, partly in side elevation, showing a spool valve embodying features of the invention, the valve being shown in its closed position to prevent inadvertent movement of a hydraulically operated part.

Fig. 2 is a section, corresponding to Fig. 1, showing the valve in one of its open positions to direct pressurized liquid to a hydraulically operated device.

Figs. 3 and 4 are fragmentary sectional views illustrating modified forms of the invention.

Referring now to the drawings for a better understanding of the invention, the valve structure is shown as comprising an elongated housing 3 formed with spaced coaxial cylindrical ports 4 and 6 leading from a common liquid supply chamber 7 to secondary liquid chambers 8 and 9, respectively. The ports 4 and 6 are normally closed by means of flow control spools 11 and 12, respectively, formed on a valve stem 13.

Liner bushings 14 and 16 are press-fitted into cylindrical bores in opposite ends of the housing for abutting engagement against fixed shoulders 19 and 21, respectively, and each bushing is secured against either axial or rotational movement by means of screws 22. The inner ends of the bushings 14 and 16 are formed with annular valve seats 23 and 24, respectively, for engagement by ring valve members 26 and 27, respectively, slidably mounted on the valve stem 13. Annular grooves are formed in the valve members 26 and 27 to receive conventional O-ring gaskets 28 and 29 to prevent leakage of liquids between said members and the valve stem 13, the O-ring gaskets being circular in cross section and formed of rubber or a suitable synthetic elastomer, such as neoprene.

The valve members 26 and 27 are normally urged into sealing engagement against their respective valve seats 23 and 24 by means of helical compression springs 31 and 32 mounted on the valve stem 13 and seated against retaining rings 33 and 34, respectively. The retaining rings are secured in annular grooves formed in the valve stem. It will be noted that the springs 31 and 32 act to yieldably resist axial movement of the valve stem, and to return the control spools and valve members from their open positions to their normally closed positions. It will also be noted that the control spools and valve members are of equal diameter to provide a balanced pressure condition within each valve chamber, whereby only a small force is required to actuate the valve.

Abutment sleeves 36 and 37 are secured to opposite ends of the valve stem 13 for engagement against the outer sides of their respective valve members 26 and 27 responsive to axial movement of the stem, whereby either member may be selectively moved away from its valve seat to exhaust liquid from their respective chambers 8 and 9.

Spool sealing members 38 and 39 are secured to opposite ends of the spool stem 13 for snug sliding engagement along the inner surface of their respective bushings 14 and 16 to prevent leakage of liquid outwardly through the bushings. Armatures 41 and 42 are also secured to opposite ends of the valve stem 13 to move the latter axially responsive to energization of their respective solenoids 43 and 44 which are secured to opposite ends of the housing 3.

In the operation of the valve thus shown and described, liquid under pressure from a pump P is directed through a conduit 46 into the liquid supply chamber 7. When the solenoid 43 is energized, the armature 41 acts to push the valve stem 13 axially to move the spool 12 out of the port 6 and to move the valve member 26 away from its seat 23, as illustrated in Fig. 2. Liquid under pressure then passes into the chamber 9 and outwardly therefrom through a conduit 47 to actuate a hydraulically operated part, such as a piston 48 mounted for reciprocative movement in a cylinder 49 to actuate airplane flaps or other parts. During movement of the piston 48, liquid is exhausted from the cylinder 49 through the conduit 51, chamber 8 and conduit 52 back to a liquid reservoir R. When the solenoid 43 is deenergized, the compression spring 32 acts to return the valve stem 13 to its closed position, as illustrated in Fig. 1.

When the solenoid 44 is energized to move the valve stem in the opposite direction, pressurized liquid is directed through the chambers 7 and 8, and conduit 51 into the cylinder 49 to move the piston 48 in the opposite direction. Upon deenergization of the solenoid 44, the spring 31 acts to return the valve stem 13 to its closed position.

By maintaining the hydraulic system filled with liquid, it will be noted that the piston 48 will not move in the cylinder 49 when the valve members 26 and 27 are engaged against their respective seats 23 and 24.

Fig. 3 illustrates a modified form of the invention wherein the spool stem 13a extends outwardly through plugs 61—61 threaded into opposite ends of the housing 3a, each plug acting to clamp a seat ring 62 against an abutment shoulder 63. An annular groove is formed in each plug to receive a conventional O-ring gasket 64. A lever 66 is pivotally connected to one end of the valve.

This form of the invention is otherwise similar to the form illustrated in Fig. 1.

Fig. 4 illustrates another embodiment of the invention wherein one end of the housing 3a is closed by a plug 67 threaded therein to engage the seat ring 62 against the shoulder 63, the other end of the housing being provided with a plug 61 through which the valve stem 13b passes for connection to an operating lever.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a valve for distributing fluid under pressure to a pair of expansible chambers, said valve including an elongated housing, said housing defining a medial supply chamber having a passageway delivering the fluid under pressure, said medial chamber being defined in part at each end by spaced walls formed with cylindrical coaxial ports having aligned inner cylindrical surfaces, secondary liquid chambers formed at each side of the medial chamber, passageways connecting each secondary chamber with an expansible chamber, liner bushings at the outer ends of the secondary liquid chambers, valve seats formed at the inner end surfaces of said bushings, outlet ports for said secondary liquid chambers formed in the liner bushings and housing outwardly of the valve seats, a slidable valve stem arranged in said housing, said sliding valve stem including a pair of spaced flow control spools positioned for sliding movement within said spaced inner cylindrical surfaces at said coaxial ports, ring valve members slidably mounted on said valve stem laterally of said flow control spools for seating engagement with the annular valve seats at the inner ends of said liner bushings, fixed abutment means on said valve stem outwardly of the ring valve members for engaging said ring valves upon movement of said valve stem to urge the ring valves from their seats, spring means normally urging said ring valves toward closed position, means for sliding said valve stem to simultaneously displace an alternate sliding ring valve and a flow control spool to position the same for the passage of fluid from the medial liquid supply chamber to a secondary liquid supply chamber for discharge into an expansible chamber and for unloading the other secondary liquid chamber through its discharge port.

2. The structure of claim 1 characterized in that the liner bushings at the outer ends of the secondary liquid chambers are removably mounted in the housing.

3. In a valve for distributing fluid under pressure to a pair of expansible chambers, said valve including an elongated housing, said housing defining a medial supply chamber having a passageway delivering the fluid under pressure, said medial chamber being defined in part at each end by spaced walls formed with cylindrical coaxial ports having aligned inner cylindrical surfaces, secondary liquid chambers formed at each side of the medial chamber, passageways connecting each secondary chamber with an expansible chamber, an auxiliary chamber at the outer end of each of said secondary liquid chambers, a discharge port for each of said auxiliary chambers, valve seats formed at the inner end surfaces of said auxiliary chambers, a sliding valve stem arranged in said housing, said sliding valve stem including a pair of spaced flow control spools positioned for sliding movement within each of said cylindrical surfaces at said coaxial ports, ring valve members slidably mounted on said valve stem laterally of said flow control spools for seating engagement with the annular valve seats at the inner ends of said auxiliary chambers, fixed abutment means on said valve stem outwardly of the ring valve members for engaging said ring valves upon movement of said valve stem to urge the ring valves from their seats, spring means normally urging said ring valves towards closed position, means for sliding said valve stem to simultaneously displace an alternate sliding ring valve and a flow control spool to position the same for the passage of fluid from the medial liquid supply chamber to a secondary liquid supply chamber for discharge into an expansible chamber and for unloading the other secondary liquid chamber through its discharge port.

4. The structure of claim 3 characterized in that the auxiliary chambers at the outer end of each of the secondary liquid chambers are of cylindrical form and the sliding valve stem is provided with enlarged end portions for slidingly engaging the walls of the auxiliary chambers to provide a mounting for the end of the stem.

5. The structure of claim 3 characterized in that the ends of the housing are closed and one closure member forms a mounting for a motor for actuating the valve stem.

6. The structure of claim 3 characterized in that the ring valves are loosely mounted on the sliding valve stem and O-rings are positioned between the ring valves and the valve stem.

7. The structure of claim 3 characterized in that the aligned inner cylindrical surfaces defining the coaxial ports have outwardly flared walls defining exit openings for the fluid.

References Cited in the file of this patent

UNITED STATES PATENTS

| 2,152,084 | Paine | Mar. 28, 1939 |
| 2,503,827 | Langmore et al. | Apr. 11, 1950 |
| 2,556,746 | Ashton et al. | June 12, 1951 |
| 2,624,585 | Churchill et al. | Jan. 6, 1953 |
| 2,634,086 | Johns | Apr. 7, 1953 |
| 2,654,392 | Allen | Oct. 6, 1953 |

FOREIGN PATENTS

| 278,814 | Germany | Oct. 6, 1914 |